United States Patent [19]

Alquier et al.

[11] Patent Number: 4,978,089
[45] Date of Patent: Dec. 18, 1990

[54] PYROTECHNIC SYSTEM FOR PROVIDING AN EMERGENCY EXIT IN AN AIRCRAFT

[75] Inventors: Bruno Alquier, Blagnac; Olivier Belou, Toulouse; Paul Devienne, Sartrouville; Thierry Martin, Toulouse, all of France

[73] Assignee: Aerospatiale Societe Nationale Industrielle, Paris, France

[21] Appl. No.: 372,894

[22] Filed: Jun. 28, 1989

[30] Foreign Application Priority Data

Jul. 13, 1988 [FR] France .................. 88 09574

[51] Int. Cl.$^5$ .............................................. B64C 1/32
[52] U.S. Cl. ................................... 244/129.5; 49/141; 89/1.14; 102/223; 244/137.2
[58] Field of Search ............... 244/129.4, 129.5, 129.6, 244/137.2; 49/141; 102/223, 229, 230; 89/1.14

[56] References Cited

U.S. PATENT DOCUMENTS

| | | | |
|---|---|---|---|
| 2,641,967 | 6/1953 | Buissiere et al. | 244/129.5 |
| 2,965,336 | 12/1960 | Lissarrague | 244/129.5 |
| 3,454,245 | 7/1969 | Burkdoll et al. | 244/137.2 |
| 4,407,468 | 10/1983 | Bement et al. | 244/137.2 |
| 4,717,096 | 1/1988 | Labarre et al. | 244/137.2 |
| 4,785,741 | 11/1988 | Gronow | 244/129.5 |

FOREIGN PATENT DOCUMENTS

| | | |
|---|---|---|
| 1088814 | 9/1960 | Fed. Rep. of Germany . |
| 2125588 | 9/1972 | France . |
| 84/01404 | 4/1984 | World Int. Prop. O. ....... 244/129.5 |

OTHER PUBLICATIONS

Astronautics & Aeronautics, vol. 19, No. 6, Jun. 1981, p. 51, N.Y., U.S.; L. J. Bement: "Explosive-Cut 'Hatch', for Small Airplanes".

Machine Design, vol. 42, No. 26, 29 Oct. 1970, p. 22, Penton, Inc., Cleveland, U.S.; "Aircraft Door Blows Open in an Emergency".

Primary Examiner—Charles T. Jordan
Assistant Examiner—Michael J. Carone
Attorney, Agent, or Firm—Marshall, O'Toole, Gerstein, Murray & Bicknell

[57] ABSTRACT

A system for providing an emergency exit in a wall of an aircraft includes a pyrotechnic device disposed against the wall, and capable of cutting a desired opening in the wall, an igniter for the pyrotechnic device, a controller for the igniter, and a manometric safety device which receives the pressures inside and outside the aircraft and inhibits the action of the igniter when the difference between the pressures inside and outside the aircraft is greater than a predetermined value.

16 Claims, 6 Drawing Sheets

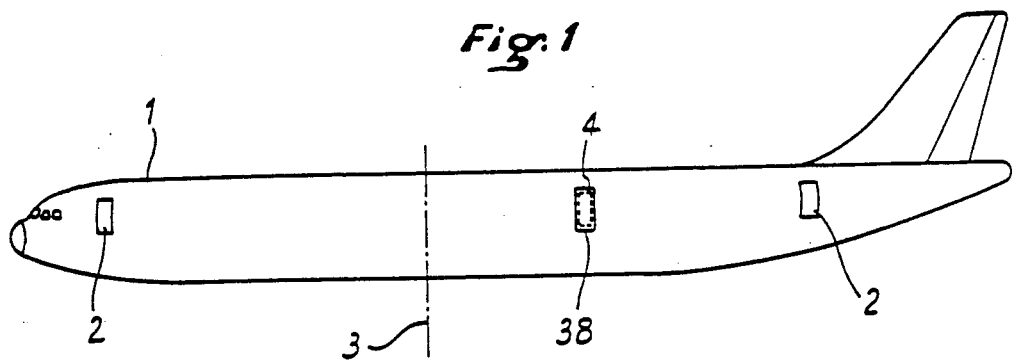
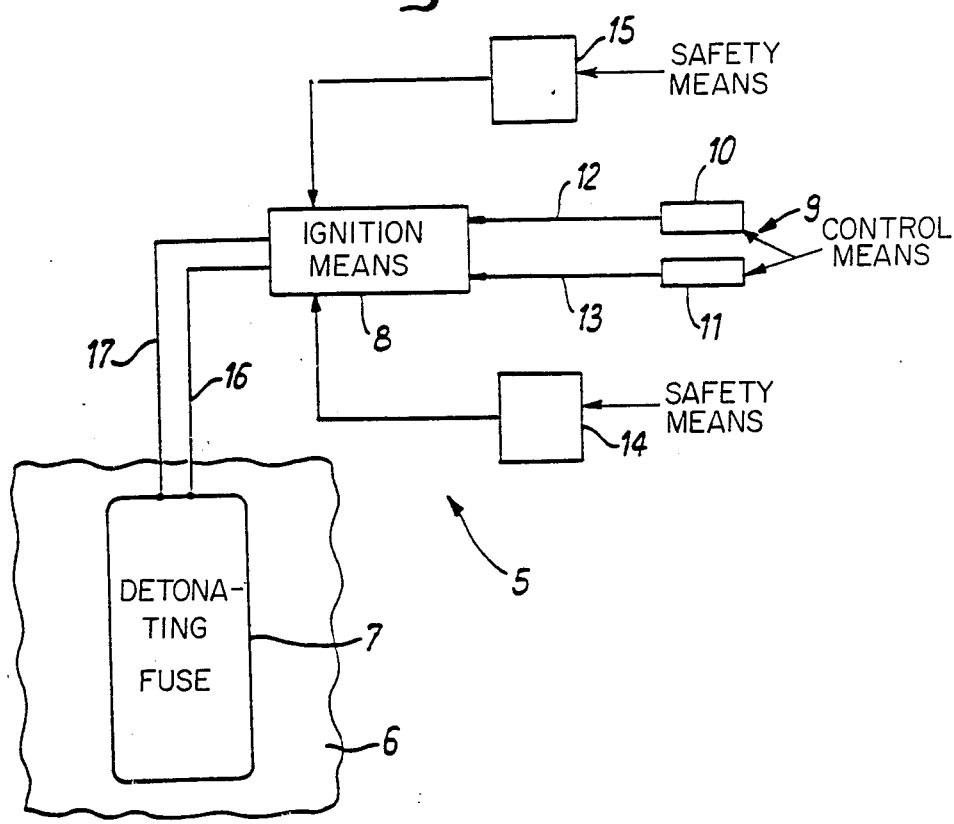

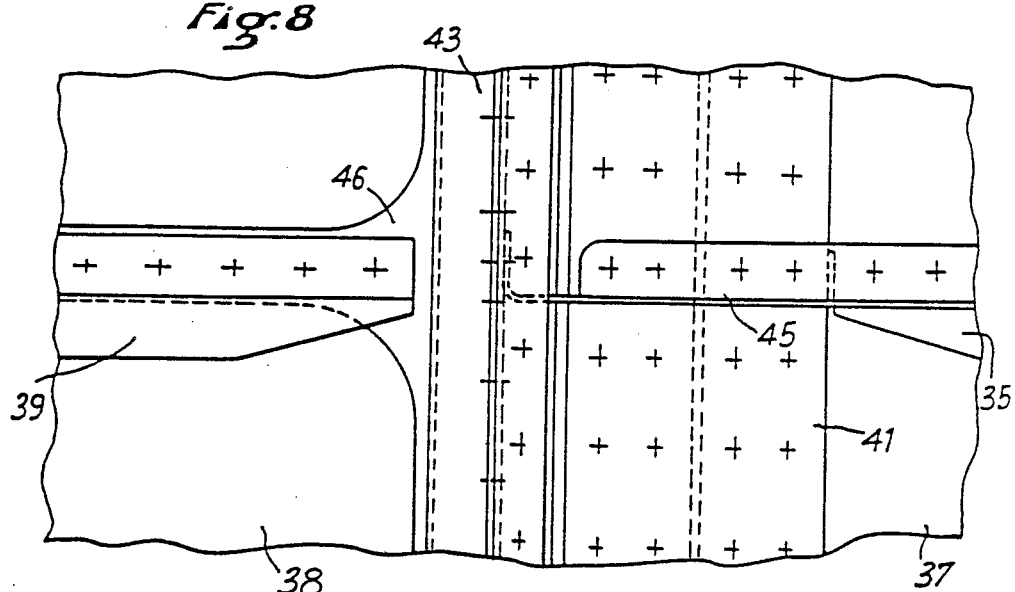
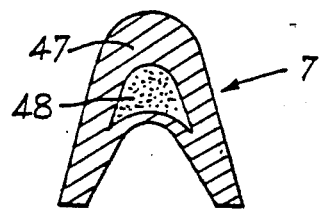
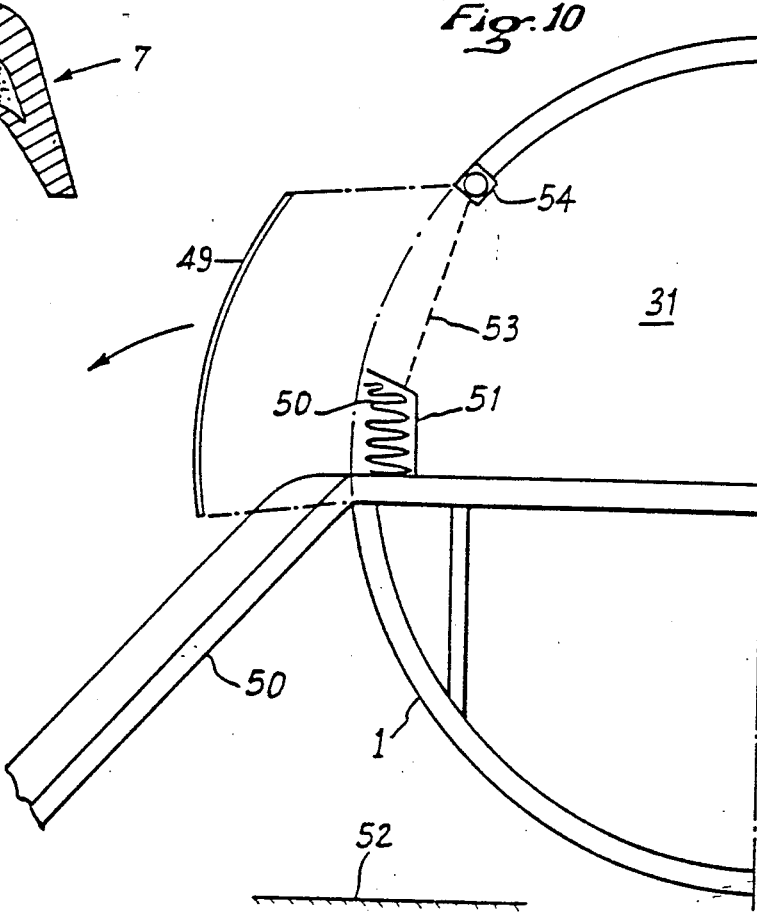

PYROTECHNIC SYSTEM FOR PROVIDING AN EMERGENCY EXIT IN AN AIRCRAFT

FIELD OF THE INVENTION

The present invention concerns a system to provide an emergency exit in a wall of an aircraft.

BACKGROUND OF THE INVENTION

On airplanes, emergency exits are provided in the fuselage, especially behind the wings. These emergency exits are intended for emergency evacuations, said exits being controlled from the inside and/or outside of the airplane. Quite clearly, such emergency exits must leave a passage wide enough to allow for evacuation of the passengers.

Up until now, such emergency exits are embodied in the form of doors whose structure is similar to the structure of the normal access doors of the airplane.

However, the embodiment of a door necessarily involves interrupting the continuity of the fuselage of the airplane, which causes difficulties, in particular owing to the need to use reinforcing pieces so as to take account of this continuity interruption. Thus, the means for embodying a door is a cumbersome, costly and complicated process, this being justified when this involves normal access doors, but far less so when this involves an emergency door only to be used in exceptional circumstances.

In addition, this type of emergency exit presents a large number of drawbacks mainly inherent in a door structure. In fact, the door risks getting stuck and the time to open it is relatively long. Furthermore, the handling of opening handles is often rendered difficult and also this type of door is heavy.

SUMMARY OF THE INVENTION

The object of the present invention is to overcome these drawbacks and concerns a system to provide an emergency exit in a wall of an aircraft, said system having a light structure allowing for easy and safe handling and making it possible to have an emergency exit made quickly without the latter possibly getting stuck or jammed.

To this effect, the system according to the invention for providing an emergency exit in a wall of an aircraft is notable in that it comprises:

pyrotechnic means disposed against said wall and delimiting the contour of said exit to be provided and able to cut said wall along said contour, means for igniting the pyrotechnic means, means for controlling said ignition means, and manometric safety means receiving the pressures inside and outside the aircraft, said means making it possible to firstly inhibit the action of said ignition means when the difference of the pressures inside and outside the aircraft is beyond a predetermined threshold, and secondly not prohibiting control of said ignition means when the difference of said pressures is below said threshold.

Consequently, the system according to the invention makes it possible to provide an emergency exit in a wall of an aircraft by using pyrotechnics. Pyrotechnics have a large number of advantages compared with conventional means (emergency doors), said advantages including rapidity, autonomy, lightness, high reliability and involving less maintenance. Moreover, the manometric safety means reliably prevent any possibility of igniting the pyrotechnic means in flight, that is as long as there is a difference exceeding a predetermined threshold between the pressures inside and outside the aircraft.

Advantageously, said threshold is at least approximately equal to 10 millibars. In fact, when the airplane is landing, a slight excess pressure of about 6 millibars may still exist there. Such a threshold makes it possible to avoid any "ill-timed" inhibition of the action of the ignition means.

In particular, said manometric safety means may be constituted by a capsule separated into two chambers by a membrane, said chambers receiving said pressures inside and outside the aircraft.

According to a further characteristic of the invention, the system includes additional safety means with deliberate control making it possible to inhibit the action of said ignition means. These additional safety means are intended to be used when the airplane is on the ground, especially when the latter is undergoing maintenance or when the aircraft fuel tanks are being filled.

According to a further characteristic of the invention, said ignition means comprise a striking pin able to activate at least one detonator.

In particular, the displacement of said membrane drives a first finger able to lock said striking pin.

Preferably, said additional safety means with deliberate control comprise an electromagnet controlling the displacement of a second finger able to lock said striking pin.

In addition, said control means may be constituted by at least one handle connected via a cable to said striking pin.

According to another characteristic of the invention, said pyrotechnic means are constituted by at least one detonating cutting fuse.

Advantageously, said detonating fuse is housed inside an approximately U-shaped cross section profile containing a filling material.

In particular, said fuse may be constituted by a lead covering encompassing a pulverulent explosive core.

The invention also relates to an aircraft, whose fuselage is constituted by longitudinal flanges, transversal flanges and an external skin, said invention being notable in that in at least one location of said fuselage, certain of said longitudinal flanges, and if necessary one or more transversal flanges, are interrupted and said skin has an aperture at the level of said interruptions, and in that said aircraft comprises at least one system as defined previously and whose pyrotechnic means are disposed against a detachable panel intended to close off said aperture inwardly to said panel.

Advantageously, said panel is rendered integral with said skin by means of a metallic frame.

In particular, said panel may be provided with reinforcement flanges parallel to said longitudinal flanges.

According to a further characteristic of the invention, said pyrotechnic means are constituted by at least one detonating fuse, said fuse being fixed to said longitudinal flanges.

Preferably, said fuse inwardly follows the contour of said metallic frame.

BRIEF DESCRIPTION OF THE DRAWINGS

The figures of the accompanying drawing shall more clearly illustrate how the invention may be embodied.

Identical references on these figures denote similar elements.

FIG. 1 is a diagrammatic view of an aircraft fuselage.

FIG. 2 is a synoptic diagram of the system for providing an emergency exit in a wall of an aircraft according to the invention.

FIGS. 6 to 8 show the disposition of the detonating fuse on a detachable panel adapted to an aperture of the fuselage of an aircraft.

FIG. 9 is a cross section of the detonating fuse.

FIG. 10 is a half cross section of an aircraft fuselage at the time the emergency exit is provided.

DETAILED DESCRIPTION OF THE PREFERRED EMBODIMENTS

Figure 3:
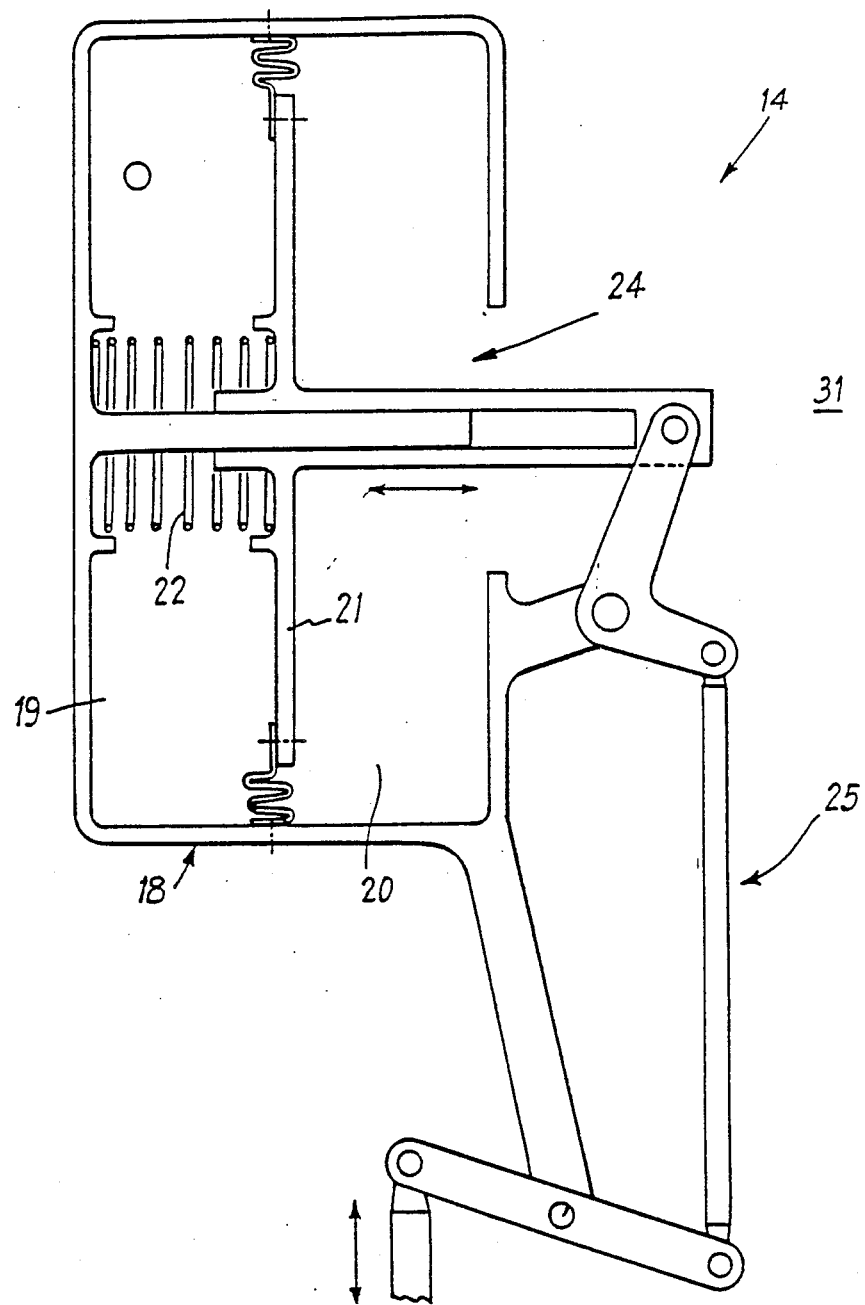
FIG. 3 shows a manometric capsule able to be used in the present invention.

FIG. 1 diagrammatically represents the fuselage 1 of a commercial aircraft. In this example, apart from the usual access doors 2, behind the wings symbolized by the line of axis 3, an emergency exit 4 is provided according to the present invention.

More specifically with reference to FIG. 2, the system 5 according to the invention to provide an emergency exit 4 in a wall of an aircraft includes:

pyrotechnic means, such as a detonating fuse 7, delimiting the contour of the exit 4 to be provided and able to cut the wall 6 along said contour, means 8 for igniting the pyrotechnic means 7 and comprising, for example, a striking pin able to activate at least one detonator, control means 9 of the ignition means 8 and comprising an external handle 10 and an internal handle 11 each connected via a cable 12, 13 to the ignition means 8, in particular the striking pin, and manometric safety means 14 (subsequently described in detail) receiving the pressures inside and outside the aircraft and making it possible to firstly inhibit the action of said ignition means 8 when the difference of the pressures inside and outside the aircraft is beyond a predetermined threshold, and secondly not prohibiting control of said ignition means 8 when the difference of said presures is below said threshold.

Preferably for those reasons previously indicated, said threshold is at least approximately equal to 10 millibars.

In addition, the system 5 comprises additional safety means 15 with deliberate control (subsequently described in detail) making it possible to inhibit on the ground the action of the ignition means 8.

Furthermore, as shown on FIG. 2, the ignition means 8 are connected to the detonating fuse 7 via two independent transmission chains 16, 17 intended to convey the pyrotechnic signal created by the impact detonator (ignition means 8) to the detonating fuse 7 whilst containing the effects due to this detonation, which avoids any harmful effects occuring outside.

Figure 4:
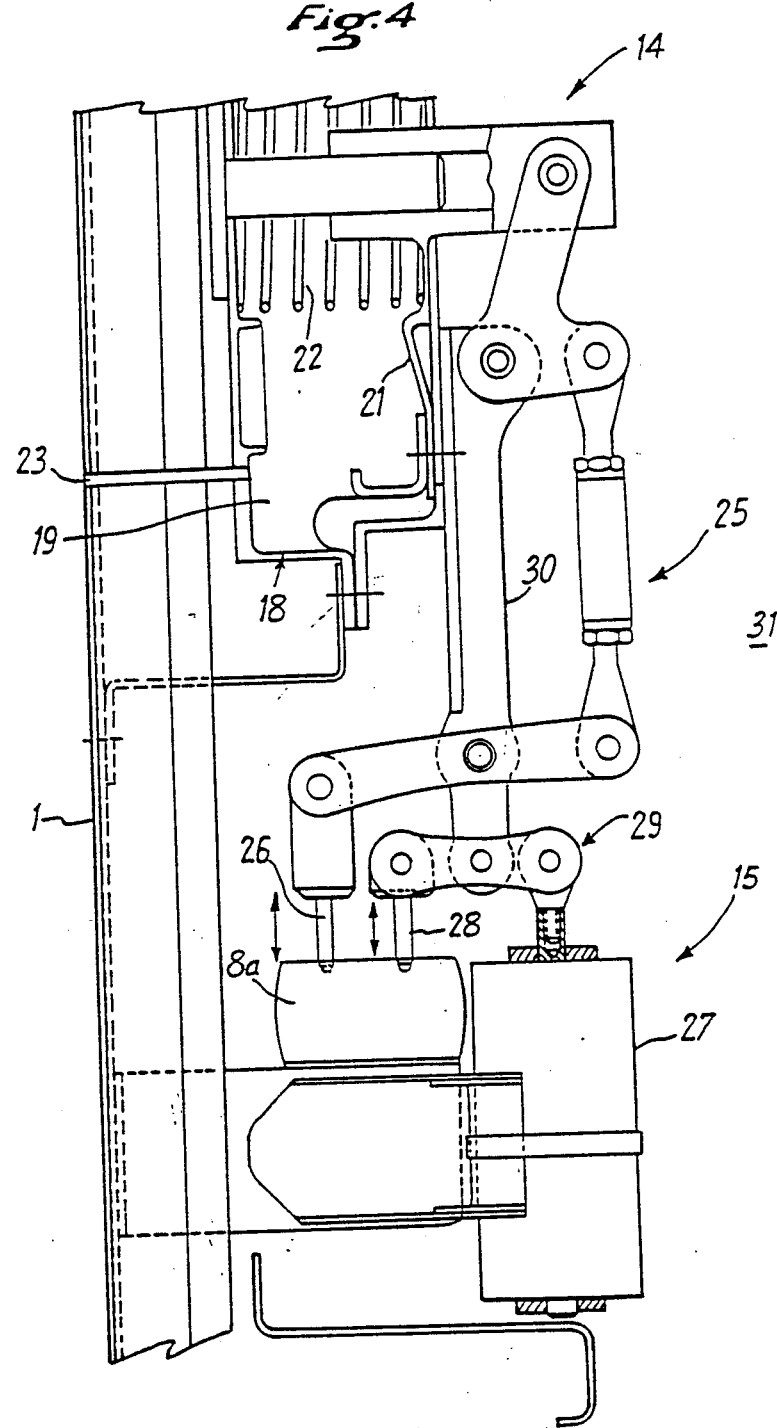
FIG. 4 illustrates the disposition of the manometric safety means and the additional safety means with deliberate control.

With reference to FIGS. 3 and 4, there now follows a detailed description of an example of embodiment of the manometric safety means 14.

As already indicated, these flight safety means 14 function by virtue of the pressure difference between the cabin of the aircraft and the outer atmosphere. In the example represented, they comprise a capsule 18 separated into two chambers 19 and 20 by a membrane 21 stressed by a spring 22 (FIG. 3). The chamber 19 communicates with the outer atmosphere via an aperture 23, whereas the chamber 20 communicates with the cabin 31 of the aircraft via an aperture 24.

Moreover and with reference also to FIG. 4, it is clear that the displacement of the membrane 21 allows for activation, by means of the rod assembly 25, of a first finger 26 able to lock the striking pin 8a. It should be mentioned that the position of the membrane shown on FIG. 4 corresponds to the case where the plane is on the ground (the finger 26 does not lock the striking pin 8a), whereas the position of the membrane 21 shown on FIG. 3 corresponds to the case where the plane is actually in flight (the "cabin" pressure is greater than the external pressure). In this latter case, the finger 26 locks the striking pin 8a (not shown).

Furthermore and with reference again to FIG. 4, the additional safety means 15 with deliberate control able to be used on the ground comprise, in the example represented, an electromagnet 27 controlling, by means of the rod assembly 29, the displacement of a second finger 28 (raised in the case of FIG. 4) able to lock the striking pin 8a.

FIG. 4 shows the rod assemblies 25 and 29 being joined onto a common support 30.

Figure 5:
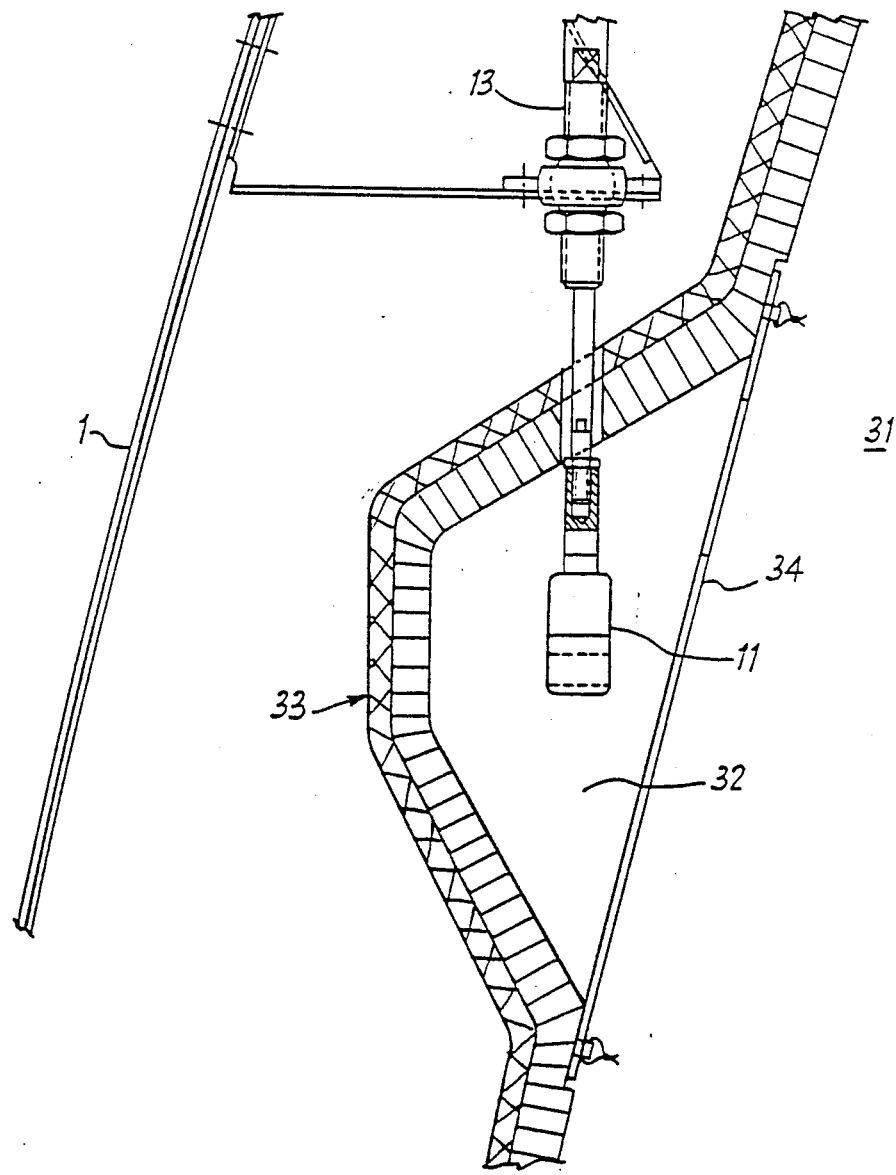
FIG. 5 shows a lower control handle of the ignition means.

On FIG. 5, the internal control handle 11 of the ignition means 8 is housed inside a recess 32 provided in the internal covering 33 of the cabin 31 and protected by a leaded plastic screen 31 so as to ensure that the handle does not get stuck by mistake.

A similar control handle (not shown in detail) shall be provided outside the aircraft so as to obviously be able to provide the emergency exit from the outside. It merely suffices to simply dispose said handle sufficiently distant from the exit so as to avoid injuring the operator.

Figure 6:
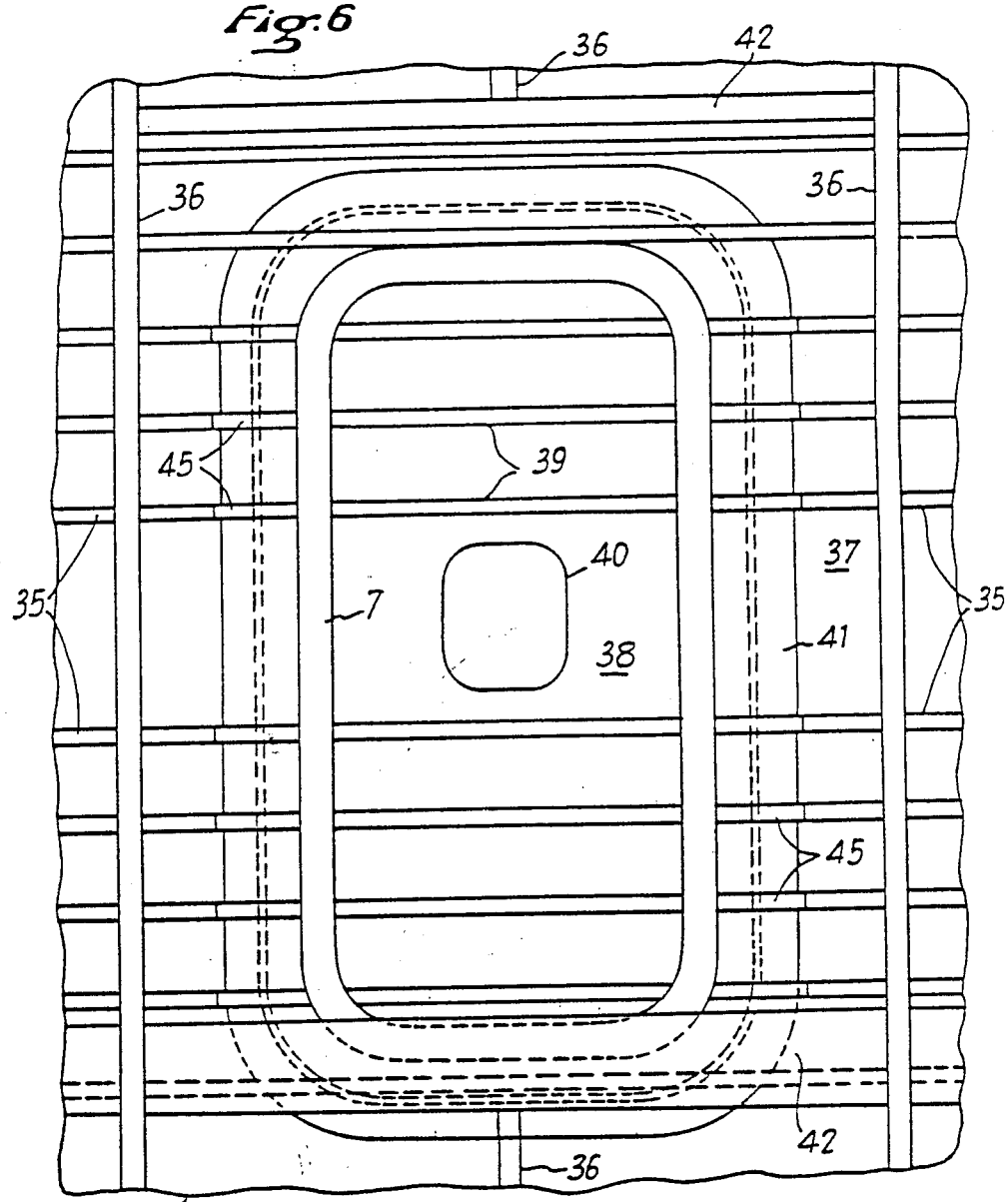
Figure 7:
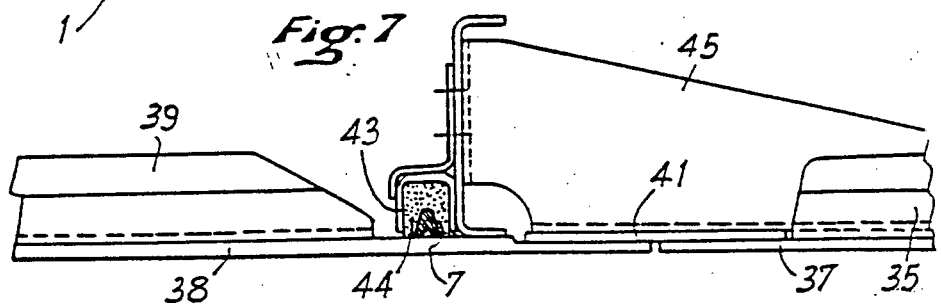

Reference is now more particularly made to FIGS. 6 to 8. These figures show the adaptation of the system for providing an emergency exit according to the invention in the fuselage 1 of an aircraft and constituted by longitudinal flanges or "rails" 35, transversal flanges 36 or "frames" and an external skin 37.

As can be seen on FIG. 6, at the location of the fuselage where it is desired to be able to provide an emergency exit, a certain number of longitudinal flanges 35 and a transversal flange 36 are interrupted and the skin 37 has an aperture at the level of these interruptions, said aperture being sealed off by a detachable panel 38 (delimited by the broken lines on FIG. 6) against which disposed is the detonating fuse 7. The panel 38 may be made of a chemically machined light alloy and stiffened by longitudinal flanges ("rails") 39. The panel 38 may also be provided with a cabin window 40. In addition, the panel 38 is rendered integral with the skin 37 by means of a metallic frame 41, the fuse inwardly following the contour of the metallic frame 41. The broken transversal flange 36 is stopped at the top and at the bottom by sails 42 intended to distribute the forces over the adjacent transversal flanges.

Reference is now more particularly made to FIGS. 7 and 8. The detonating fuse 7 is housed in an approximately U-shaped cross section profile 43 containing a filling material 44, for example a synthetic foam. The fuse 7 is fixed to the mechanical part 43 fixed to the longitudinal flanges 35 by means of hammers 45, these being fixed to the metallic frame 41. An excess thickness 46 of the panel 38 exists at the level of the flanges 39 and of the fuse 7, which increases the rigidity of the panel so as to obtain a "clean" cutting of said fuse.

FIG. 9 shows a cross section view of an example of a fuse 7 constituted by a lead or aluminium sheath enclosing a pulverent explosive core 48, for example cyclonite.

There now follows a description of the functioning of the system of the invention.

As long as the plane is flying, the difference between the "cabin" pressure and the external pressure keeps the membrane 21 of the manometric capsule 18 displaced towards the left (FIG. 3), the finger 26 then locking the striking pin 8a. In this case, the action of the ignition means 8 is inhibited, even in the event of ill-timed operation of the internal control handle 11. When the plane is on the ground, the internal and external pressures counterbalance each other, the membrane 21 is displaced towards the right (FIG. 4) which, by means of the rod assembly 25, results in displacement of the finger 26 so as to free the striking pin 8a. It should be mentioned that the additional safety means 15 with deliberate control are activated on the order or action of the plane Captain, for example. Thus, when the plane reaches the ground, that is at the time it is possible to carry out a required emergency evacuation, said safety means 15 are inactivated (FIG. 4).

In an emergency, the operations required to provide the emergency exit are the following:

After having removed the leaded plastic frame 34, the operator pulls the handle 11 (FIG. 5) which, via the cable 13, acts on the striking pin of the ignition means 8 (FIG. 7), said ignition means itself acting on the detonator by provoking initiation of the two transmission chains 16, 17. These chains transmit detonation to the cutting fuse 7 which, via directive projection of molten lead particles according to the principle of hollow charges, cuts the sheet metal of the panel 38 along the contour of said fuse 7. The corresponding part 49 of the panel 38 is then ejected transversally outwards to the fuselage 1 (FIG. 10). The chute 50, which is housed in a casisson 51 in front of the exit, may then be extended by a single kick of a foot and unroll as far as the ground 52, thus allowing for quick evacuation of the passengers.

If, at the time of evacuation, a fire starts outside, in order to be able to block the exit, a non-inflammable fabric curtain 53 is provided, normally rolled up in a box 54 situated above the exit (FIG. 10).

It is clear that control of the ignition means 8 may be effected similarly from the handle 10 outside the aircraft.

Moreover, the time between activating the control handle and ejection of the cut panel 49 lasts about 1/10th of a second; the gain in time is thus highly considerable with respect to the time required to open a conventional emergency door.

In addition, the functioning of the system according to the present invention is autonomous. As regards its ignition, additional energy sources do not need to be placed on board the plane (no floating batteries), disengagement or triggering being fully effected by a person acting on the handle once the safety devices are lifted. The installation of the system of the invention thus does not result in any weight increase.

What is claimed is:

1. Emergency exit system in a wall of an aircraft, including:
   pyrotechnic means disposed against said wall and delimiting the contour of an exit to be provided and able to cut said wall along said contour,
   ignition means for said pyrotechnic means,
   control means for said ignition means, and
   manometric safety means receiving the pressures inside and outside the aircraft and making it possible to firstly inhibit the action of said ignition means when the difference of the pressures inside and outside the aircraft is above a predetermined threshold, and secondly not prohibiting control of said ignition means when the difference of said pressures is below said threshold.

2. System according to claim 1, wherein said threshold is at least approximately equal to 10 millibars.

3. System according to claim 1, wherein said manometric safety means are constituted by a capsule separated into two chambers by a membrane, said chambers receiving said pressures inside and outside the aircraft.

4. System according to claim 1, wherein it comprises additional safety means with deliberate control making it possible to inhibit the action of said ignition means.

5. System according to claim 4, wherein said ignition means include a striking pin able to activate at least one detonator.

6. System according to claim 3, wherein the displacement of said membrane activates a first finger able to lock said striking pin.

7. System according to claim 5 wherein said additional safety means with deliberate control include an electromagnet controlling the displacement of a second finger able to lock said striking pin.

8. System according to claim 2, wherein said control means are constituted by at least one handle connected by a cable to said striking pin.

9. System according to claim 1, wherein said pyrotechnic means are constituted by at least one detonating fuse.

10. System according to claim 9, wherein said detonating fuse is housed inside an approximately U-shaped cross section profile containing a filling material.

11. System according to claim 10, wherein said fuse is constituted by a lead sheath enclosing a pulverent explosive core.

12. Aircraft having a fuselage constituted by longitudinal flanges, transversal flanges and an outer skin, wherein, in at least one location of said fuselage, certain of said longitudinal flanges and, if required, one or more transversal flanges are interrupted, and said skin contains an aperture at the level of said interruptions, said aperture being closed by a detachable panel, said aircraft further comprising at least one emergency exit system comprising
   pyrotechnic means disposed against said panel, and delimiting the contour of an exit to be provided and able to cut said panel along said contour,
   ignition means for said pyrotechnic means,
   control means for said ignition means, and
   manometric safety means receiving the pressures inside and outside the aircraft and making it possible to firstly inhibit the action of said ignition means when the difference of the pressures inside and outside the aircraft is above a predetermined threshold, and secondly not prohibiting control of said ignition means when the difference of said pressures is below said threshold.

13. Aircraft according to claim 12, wherein said panel is rendered integral with said skin by means of a metallic frame.

14. Aircraft according to claim 13, wherein said panel is provided with reinforcement flanges parallel to said longitudinal flanges.

15. Aircraft according to claim 14, wherein said pyrotechnic means are constituted by at least one detonating flange and said fuse is fixed to said longitudinal flanges.

16. Aircraft according to claim 15, wherein said fuse internally follows the contour of said metallic frame.

* * * * *